United States Patent [19]
Jeffers

[11] 3,757,353
[45] Sept. 4, 1973

[54] INFORMATION RECORDING BY ARTICLE ORIENTATION

[75] Inventor: Frederick J. Jeffers, Altadena, Calif.

[73] Assignee: Bell & Howell Company, Chicago, Ill.

[22] Filed: Mar. 10, 1972

[21] Appl. No.: 233,650

[52] U.S. Cl. .......... 346/74 M, 346/74 MP
[51] Int. Cl. .......... G01d 15/12
[58] Field of Search .......... 346/74 M, 74 MP

[56] References Cited

UNITED STATES PATENTS

| | | | |
|---|---|---|---|
| 3,562,760 | 2/1971 | Cushner et al. | 346/74 MT |
| R25,822 | 7/1965 | Tate | 346/74 MP |
| 3,564,156 | 2/1971 | Greiner et al. | 346/74 MT |

*Primary Examiner*—James W. Moffitt
*Attorney*—Luc P. Benoit

[57] ABSTRACT

An information recording medium has magnetizable anisotropic particles located in a plurality of spaced first matrices which have a first state in which the particles are maintained substantially stationary and which are transformable into a second state in which the particles are mobile. A solid second matrix contains the first matrices for maintaining the first matrices in position while the first matrices are in the first state and while the first matrices are in the second state.

Information recording methods employing such media are also disclosed.

25 Claims, 18 Drawing Figures

INFORMATION RECORDING BY ARTICLE ORIENTATION

CROSS-REFERENCE TO RELATED APPLICATIONS

Subject matter disclosed herein is disclosed and claimed in one or more of the following patent applications or patents which are assigned to the subject assignee and which are herewith incorporated by reference herein:

Patent Application Ser. No. 233,664, filed of even date herewith, by Sherman W. Duck; and Patent Application Ser. No. 233,646, filed of even date herewith, by Frederick J. Jeffers.

BACKGROUND OF THE INVENTION

1. Field of the Invention

The subject invention relates to information recording and, more particularly, to the recording of information by a selective orientation or disorientation of ferromagnetic particles.

2. Description of the Prior Art

There exists a considerable number of proposals according to which information is recorded by a process including an information-responsive orientation or acicular ferromagnetic particles in a temporarily fluidized matrix. These proposals, while promising in principle, have not so far been able successfully to compete with conventional information recording techniques.

More specifically, the ferromagnetic particles in conventional orientation recording media tend progressively to agglomerate during fluidization of the matrix. This precludes reusability of the recording medium. By way of contrast, conventional magnetic recording methods or thermoplastic recording techniques permit reuse of the recording medium.

It is also difficult in practice to realize recording media in which the matrix is sufficiently fluidizable to permit acicular particles to rotate about their short axes for the requisite orientation. To accomplish this goal, the matrix has to be fluidizable practically to a liquid state. On the other hand, the structural integrity of the recording medium suffers if the matrix is liquefied.

It has also been observed that known orientation recording media will suffer surface deformation when the acicular particles are rotated about their short axes in the fluidized matrix. This renders magnetic readout or printout of the recorded information difficult. Unwanted surface deformations also impair optical readout.

In the case of magnetic readout or printout, a further drawback of conventional proposals arises from the fact that it is difficult to find a matrix material that is ideally suitable for the particle orientation process in terms of fluidizability and that is yet ideally suited for use in connection with magnetic readout equipment of printout apparatus and agents.

SUMMARY OF THE INVENTION

The subject invention overcomes the above mentioned disadvantages and provides superior information recording media and methods.

From one aspect thereof, the subject invention resides in an information recording medium comprising, in combination, magnetizable anisotropic particles, a plurality of spaced first matrices having said particles located therein and having a first state in which the particles are maintained stationary and being transformable into a second state in which the particles are mobile, and means including a solid second matrix containing the first matrices for maintaining the first matrices in position while the first matrices are in the first state and while the first matrices are in the second state.

From another aspect thereof, the subject invention resides in an information recording method which is characterized by the improvement comprising in combination the steps of providing magnetizable anisotropic particles, enclosing the particles in a plurality of first matrices having a first state in which the particles are maintained substantially stationary and being transformable into a second state in which the particles are mobile, providing the first matrices with the enclosed particles in a solid second matrix for maintaining the first matrices in position while the first matrices are in the first state and while the first matrices are in the second state, transforming predetermined ones of the first matrices selected in accordance with the information to the second state, and magnetically orienting the anisotropic particles in the predetermined first matrices to provide an information record.

From another aspect thereof, the subject invention resides in an information recording method characterized by the improvement comprising in combination the steps of providing magnetizable anisotropic particles, enclosing the particles in a plurality of first matrices having a first state in which the particles are maintained substantially stationary and being transformable into a second state in which the particles are mobile, dispersing the first matrices with the enclosed particles in a substantially solid second matrix for maintaining the first matrices in position while the first matrices are in the first state and while the first matrices are in the second state, transforming the first matrices to the second state and orienting and magnetizing the anisotropic particles in the first matrices, transforming the first matrices to the first state, and transforming predetermined ones of the first matrices selected in accordance with the information to the second state whereby the anisotropic particles in the predetermined first matrices will become disoriented to display minimum net magnetic moments.

BRIEF DESCRIPTION OF THE DRAWINGS

The subject invention and various aspects thereof will become more readily apparent from the following detailed description of preferred embodiments of the invention, illustrated by way of example in the accompanying drawings, in which:

FIGS. 12 and 12*b* constitute a flow sheet of yet another preferred embodiment of the subject invention.

In the accompanying drawings, like reference numerals among different figures designate like or functionally equivalent parts.

DESCRIPTION OF PREFERRED EMBODIMENTS

Figure 1:
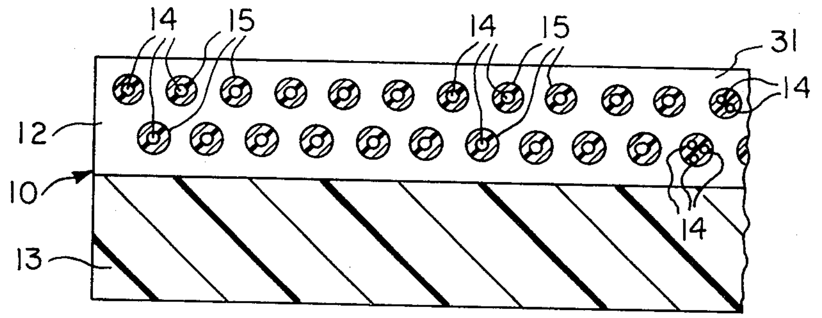
FIG. 1 is a diagrammatic longitudinal section through a recording medium according to a preferred embodiment of the subject invention.

The magnetic recording medium 10 according to the preferred embodiment of the subject invention shown in FIG. 1 includes an information recording layer 12 located on a substrate 13. By way of example, and not by way of limitation, the substrate 13 may be a foil of a plastic material, such as teflon (polytetrafluoroethylene) or "Mylar" or "Cronar" (registered trademarks of E.I. du Pont de Nemours & Company). Other suitable substrate materials include glass.

The information recording layer 12 includes a multitude of magnetizable anisotropic particles 14. The expression "magnetizable" as herein employed with respect to the particles 14 refers to the well-known property of so-called magnetically hard particles of retaining an imposed magnetization after removal of the external magnetic field with which the magnetization has been imposed. The expression "magnetizable" as herein employed is intended to be broad enough to cover not only particles which are to be or can be magnetized in the latter sense, but also particles which have been magnetized in the latter sense.

The expression "anisotropic" as herein employed is intended to be sufficiently broad to cover crystal anisotropy and shape anisotropy. In the preferred embodiment of FIG. 1, the ferromagnetic particles are spherical and uniaxially anisotropic. Particles with shape anisotropy are described below in connection with FIG. 3. "Uniaxial anisotropy" as herein employed refers to the type of magnetocrystalline anisotropy of a magnetizable material that is characterized by a single axis of easy magnetization or minimum internal magnetic energy, and by external magnetization minima or internal magnetic energy maxima in a plane intersecting the easy axis substantially at right angles. Uniaxial anisotropy is a well-known magnetic property and as such does not require particular elaboration. Needless to say, the uniaxial anisotropy of the particles herein employed should, of course, be high enough for an orientation effect of the type herein employed, and the particles should be magnetizable and capable of retaining an imposed magnetization.

The expression "spherical" as herein employed with respect to the magnetizable particles is intended to be borad enough to cover not only perfect spheres but also those spheroids and hydrodynamically equivalent shapes which provide the magnetizable particles with rotatability and other hydrodynamic properties in the matrix which are equivalent in practice to hydrodynamic properties of particles of exact spherical shape.

Preferred uniaxially anisotropic materials for the particles 14 include hexagonal cobalt, manganese bismuthide (MnBi), or a cobalt compound of the type $Co_5$ R, wherein R is a rare-earth metal, such as gadolinium or yttrium which are frequently classified as rare-earth metals. Many other hard magnetic materials are, however, suitable for the practice of the subject invention.

In accordance with another preferred embodiment of the subject invention, the particles 14 are of single-domain size. As is well known in magnetics, the expression "single domain" refers to the absence of Bloch walls in the particles. Due to this absence, uniaxailly anisotropic particles are rotated physically by the aligning magnetic field, rather than undergoing merely realignment of magnetic spins within the particle.

The information recording layer 12 further includes a plurality of spaced first matrices 15 having the particles 14 located therein and having a first state in which the particles are maintained substantially stationary and being transformable into a second state in which the particles are mobile.

In the illustrated embodiments, only one particle 14 is typically shown for each matrix 15. This is in accordance with a preferred embodiment of the invention in which each particle 14 is provided with a shell of the material of which the matrix 15 is made. On the other hand, the subject invention extends also to embodiments in which each matrix 15 has two or more (i.e. more than one) particles 14 located therein, as indicated at the right-hand side of FIG. 1.

The spherical shape of the particles 14 shown in FIG. 1 is very advantageous in that it permits the particles to rotate in the matrices 15 with the least resistance as compared to acicular shapes, when the matrices 15 are fluidized. If two or more particles 14 are located in the same matrix 15, then a spherical particle shape has the further advantage that the velocity of undesirable particle agglomerations is very substantially reduced by the poor hydrodynamic properties of translatorily moving spherical bodies.

Many materials are suitable for the matrices 15 as long as they have the above mentioned requisite first state under a first condition or set of conditions, and are transformable into an information-modulated manner into the requisite second state in which the particles 14 are mobile. Typically, the transformation into the second state will not be permanent, but the matrix, upon cessation of the information-modulated influence, will revert to the first state in which the ferromagnetic particles 14 are again substantially stationary.

By way of example and not by way of limitation, suitable materials for the matrices 15 include acetals, acrylics, polyesters, silicones, and vinyl resins having a substan-tially infinite room temperature viscosity and a substantially fluid viscosity temperature of the order of about 100°C to 150°C. Other suitable materials for the matrices 15 include waxes which typically exhibit a relatively sharp melting point transition. If desired, wax and polymer mixtures may be employed.

In the case of waxes, the matrices 15 may, for instance, be formed by spray-drying a dispersion of particles 14 in a hot wax solution. In the case of polymer matrices, the matrices 15 may, for instance, be formed by a precipitation of the polymer on particles 14 in a polymer solution with water added to the cloud point, or by polymerization of a monomer, such as an acrylate, diacetone acrylamide or vinyl monomer, coated on the particles 14, or by another known particle encapsulation technique. Another well-known technique, useful for polymer or gelatin matrices, is the coacervation of particles 14 in a sphere of gelatin or other polymer. The art of encapsulating particles has become a well-known and widely used technology in recent years.

While the subject disclosure is primarily styled in terms of matrices that are fluidizable upon thermal exposure, it should be understood that the subject invention is not intended to be so limited. By way of further example, the matrices 15 may include a photosensitive material the viscosity of which is locally changeable upon a photographic exposure thereof. For instance, the matrices 15 may include a photopolymerizable material which becomes polymerized when exposed to actinic radiation. Those areas of the matrix which have not been polymerized by photographic exposure have a viscosity which can be decreased by heating, thereby permitting the particles 14 to rotate as described below. On the other hand, the regions which have become polymerized by photographic exposure will display a high viscosity, even upon heating, which inhibits a rotation of particles in those regions.

In the photosensitive embodiments of the subject invention, thermoplastic materials with photographic emulsion matrices, such as polyvinyl alcohol and gelatin, may be employed in the matrices 15. For one preferred photosensitive matrix, N-vinyl carbazone, carbon tetrabromide and 4-p-dimethylaminostyrylquinoline is dispersed in polyvinyl alcohol. Alternatively, polyvinyl cinnamate is used as sole or partial polymer with bis(hydroxy)benzophenone as photosensitizer.

Further photosensitive embodiments may be derived from U.S. Pat. No. 2,798,960, Photoconductive Thermography, by A.J. Moncrieff-Yeates, issued July 9, 1957, and herewith incorporated by reference herein. That patent discloses several devices in which a layer of a thermoplastic material, such as a wax, is selectively fluidized by a pattern of heat gradients produced by photoconductive means that give rise to electric current patterns upon an information-wise luminous exposure.

Figure 2:
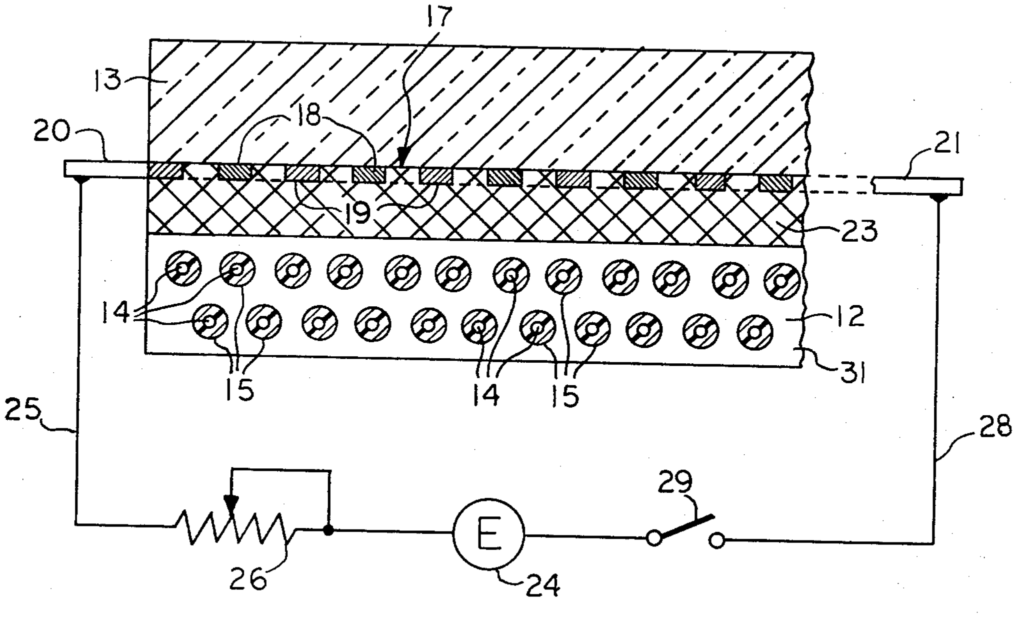
FIG. 2 is a diagrammatic longitudinal section of a modification of the recording medium of FIG. 1, in accordance with a further preferred embodiment of the subject invention.

A further photosensitive embodiment is shown in FIG. 2 in which an interdigitated electrode structure 17 is located on the substrate 13. The electrode structure 17 includes electrodes 18 and 19 which are interdigitated with each other. The electrodes 18 are connected to a bus bar 20, and the electrodes 19 are connected to a bus bar 21. The bus bar 20 may be located on the rear portion of the substrate 13 as seen in FIG. 2, and the bus bar 12 may be located on a front portion of the substrate 13 as seen in FIG. 2. The electrodes 18 then extend from the bus bar 20 to the vicinity of the bus bar 21, and the electrodes 19 extend from the bus bar 21 to the vicinity of the bus bar 20. The electrode structure 17 may be deposited on the substrate 13 by evaporation, painting or sputtering. Preferred electrode materials include gold, indium, chromium and aluminum.

A photoconductive layer 23 is deposited on the substrate 13 and electrode structure 17. Suitable photoconductive materials include cadmium sulfide, cadmium selenide, alloys of cadmium sulfide or cadmium selenide, and sensitized zinc sulfide. The thickness of the photoconductive layer 23 is not generally critical, but a layer thickness of about 3 to 10 microns is presently preferred.

The bus bar 20 is connected to one terminal of a source of electric power 24 by means of a lead 25 and a variable resistor 26. The bus bar 21 is connected to the other terminal of the power source 24 by means of a lead 28 and normally open switch 29.

To operate the photocell assembly, the switch 29 is closed and the variable resistor 26 is adjusted to provide for the requisite current flow. Information-modulated light which impinges upon the photoconductor layer 23 will provide a pattern of electrically conductive paths which corresponds to the information to be recorded. Current flowing from the source 24 through the variable resistor 26 and closed switch 29 will generate heat in the current conductive paths and a heat image corresponding to the information to be recorded will thus be generated. This heat image is employed to selectively fluidize matrices 15 in a distribution pattern corresponding to the information to be recorded. Information-responsive orientation or disorientation processes occurring upon such fluidization of the matrix 15 will be described in the further course of this disclosure.

At the present time it is to be noted that the recording layer 12, which is deposited on the substrate 13 in the embodiment shown in FIG. 1 or on the photoconductor layer 23 in the embodiment shown in FIG. 2, includes a second matrix 31 containing the first matrices 15. The second matrix 31 is solid for maintaining the first matrices 15 in position while the first matrices are in the above mentioned first state and while the first matrices are in the above mentioned second state. If the matrices 15 are of a thermally fluidizable material, then the matrix 31 is of a thermally stable material which maintains the matrices 15 in their initial position both while these matrices are solidified and while these matrices are fluidized. In brief, the matrix 31 is of a material which remains solid upon thermal exposure of the matrices 15. There are many suitable materials for the matrix 31. By way of example and not by way of limitation, the matrix 31 may be made of polymethylmethacralate, polyvinylchloride, polyamides, polyimides, polystyrene, and the like.

The matrices 15 including particles 14 may be incorporated in the matrix 31 by such methods as dispersion in the liquefied material for the matrix 31 by ball milling, high speed agitation, roller milling or ultrasonic agitation, being non-destructive of the matrices 15 with included particles 14. The dispersion of the matrices 15 with included particles 14 in the material of the matrix 31 may be coated on the substrate 13 with the aid of a doctor blade, roller or dip coating technique, for instance. The matrix 31 may then be hardened or solidified by cooling or solvent evaporation for example.

In practicing the subject invention, it should be noted that there is no absolute need for the substrate 13. Rather, the substrate 13 may be omitted of the main matrix 31 is of a sufficiently tear-resistant material, such as polyvinylcloride, poliamide or polyimide, for example.

The expression "fluidizable" as herein employed refers to a property of the matrices 15 which renders the matrices individually transformable into a substantially liquid state, while the expression "fluid" or "fluidized" refers to such a state.

Figure 4:
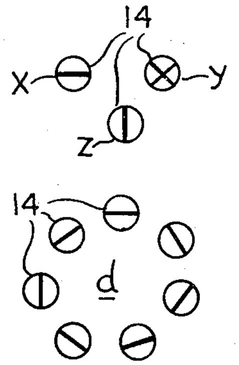
FIG. 4 is a diagrammatic illustration of particle orientations occurring in the practice of various embodiments of the subject invention.

To facilitate an understanding of the subject disclosure, preferred orientations of the uniaxially anisotropic particles 14 in the matrices 15 and 31 are symbolically illustrated in FIG. 4. These symbols concern the orientation of the magnetocrystalline "easy axis of magnetization" or minimum internal energy axis of the uniaxailly anistropic ferromagnetic particles 15. As may anisotropic seen from FIG. 4, an "*x*-orientation" is present if the particles are oriented parallel to an *x*-axis, which extends horizontally in the plane of the paper on which FIG. 4 is drawn. The particles have a "*y*-orientation" when they are oriented parallel to a *y*-axis, which extends perpendicularly through the plane of the paper. A "*z*-orientation" is present if the particles are oriented parallel to a *z*-axis, which extends vertically in the plane of the drawing paper.

FIG. 4 also diagrammatically depicts a low energy state of the particles 14 which occurs when particles are magnetized and matrices are fluidized so that particles are permitted to rotate and seek a low-energy state in which their net magnetic moment is minimized. In this manner the particle orientations are "randomized". While it may be true that the latter term may not strictly be applicable in its classical sense, it will be noted that the particles presently under consideration are disoriented relative to the *x*, *y* and *z*-orientations, wherefore the symbol *d* is employed for the depicted low-energy state.

Figure 6:
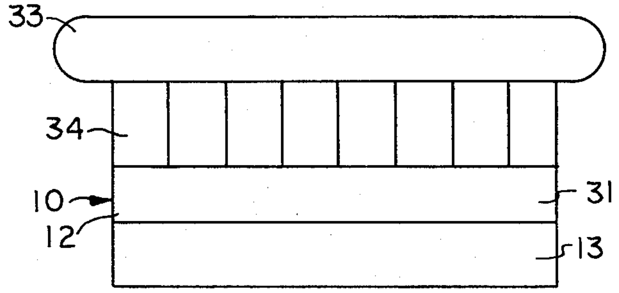
FIG. 6 is a diagrammatic elevation of a method and apparatus useful in the practice of various embodiments of the subject invention.

To provide for a desired orientation of particles in a particular matrix portion, a fluidization of that matrix portion is effected. If the matrices 15 are thermally fluidizable, this is done by thermal exposure. By way of example, a source 33 of infrared or strong light radiations 34 is diagrammatically shown in FIG. 6 for thermally exposing the matrices 15.

Figure 7:
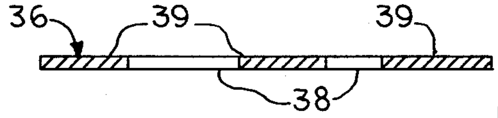
FIG. 7 is a longitudinal section through a simplified master record of information to be recorded.

If an information-wise exposure of the matrices 14 is desired, an information record of the type shown at 36 in FIG. 7 is inserted between the source 33 and recording medium 10 for an information-wise spatial modulation of the thermal radiations 34. The record 36 of FIG. 7 is composed of complementary infrared-transparent and infrared-opaque portions 38 and 39, respectively, which jointly present the information to be recorded. This type of information record and information exposure technique is, of course, just one of the many well-known infrared exposure techniques (or light-exposure techniques if a photosensitive embodiment is used) that are applicable in the practice of the subject invention.

Figure 8:
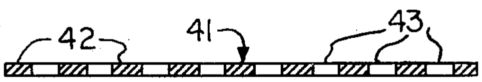
FIG. 8 is a longitudinal section through a half-tone screen that may be used in the practice of certain embodiments of the subject invention.

A half-tone screen 41 of the type shown in FIG. 8 may be inserted between the source 33 and recording medium 10 if a half-tone rendition in accordance with one of the embodiments disclosed below is desired. The screen 41 is composed of alternating infrared-transparent and infrared-opaque portions 42 and 43, respectively.

In the practice of the illustrated embodiments of the subject invention, particles 14 in fluidized matrices 15 are oriented into a desired direction (*x*, *y*, or *z*) by exposing the particles to an orienting magnetic field. In the further course of this disclosure, the symbol $M_x$ is employed to designate a magnetic field that orients particles in parallel to the *x*-axis, while the symbol $M_y$ is used to designate a magnetic field that orients particles in parallel to the *y*-axis, and the symbol $M_z$ is employed to designate a magnetic field which orients particles in parallel to the *z*-axis.

Figure 5:
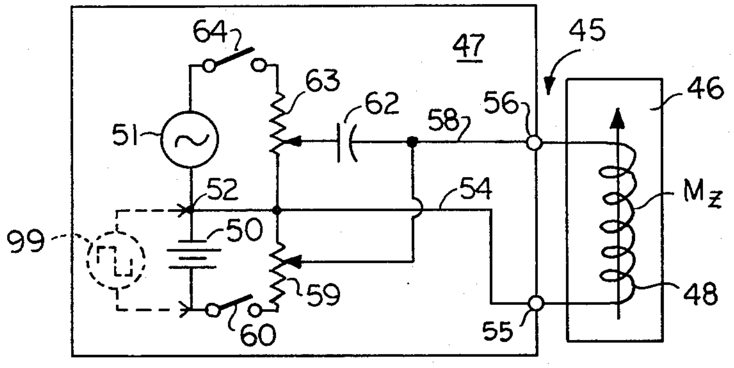
FIG. 5 is a circuit diagram of energizing and magnetizing apparatus useful in the practice of various embodi-ments of the subject invention.

Suitable magnetizing equipment 45 is schematically illustrated in FIG. 5. This equipment is composed of a magnetizer 46 and an energizer 47. The magnetizer 46 includes an electrically energizable magnet coil or bobbin 48. The coil 48 is symbolic for the many electromagnetic magnetizing structures that may be employed. These structures may, for instance, take the form of a solenoid or Helmolz coil that compasses or contains the recording medium 10 (see the magnetizing coils disclosed in U.S. Pat. No. 2,793,135, by J.C. Sims et al, issued May 21, 1957, the disclosure of which is herewith incorporated by reference herein). If desired, conventional types of ferromagnetic magnetizing structures which have pole pieces that have all or part of the recording medium 10 located thereat or therebetween may be employed in the magnetizer 46. Because of the geometrical dimensions of the recording medium 10, it may be found preferable in practice to use a differently shaped magnetizing structure for the different orientation directions.

The energizer 47 of FIG. 5 provides the magnetizer 46 with electrical energizing current. To this effect, the energizer 47 includes two series-connected electric current sources 50 and 51. The source 50 may be of a conventional direct-current type. The junction 52 between the sources 50 and 51 is connected by a lead 54 to a terminal 55 of the magnetizer 46. The other terminal 56 is connected to the source 50 by a lead 58, a potentiometer 59 and a normally open switch 60. The intensity of the magnetic field provided by the magnetizer 46 is variable by adjustments of the potentiometer 59.

The terminal 56 of the magnetizer 46 is also connected to the source 51 by a capacitor 62, a potentiometer 63 and a normally open switch 64. The source 51 is a source of alternating current of relatively high frequency. When the switch 64 is closed, the source 51 is connected to the magnetizer 46 which then produces an alternating magnetic field with which particles may be degaussed. The degaussing or demagnetizing operations herein referred to are not necessarily directed to the demagnetization or degaussing of particles individually. Of course, in the case of multi-domain particles, degaussing or demagnetization of particles individually is possible. However, in the case of single-domain particles, the particles are not demagnetized or degaussed individually. Rather, magnetic moments of adjacent particles are flipped into opposition to each other to provide no or only a negligible net magnetic moment.

If the switch 60 is closed while the switch 64 is open, the source 50 is connected to the bobbin 48 and the magnetizer 46 provides a continuous magnetic orienting field. Magnetic particles 14 are oriented in a desired direction (*x*, *y*, or *z*) when they are exposed to the latter orienting field while the particular matrices 15 are fluidized. The position of the recording medium 10 relative to the magnetizer 46 determines the direction (e.g., *x*, *y* or *z*) in which the particles are oriented.

In the practice of the subject invention, spherical particles 14 are preferred for their ease of rotatability and for the resistance of spherical shapes against lateral movement in the fluidized matrices 15 and intimate contact with portions of the main matrix 31. However, it is a feature of the subject invention that the requisite anisotropy of the particles 14 may be a shape anisotropy. Accordingly, the magnetizable particles may be acicular as indicated at 14' in FIG. 3. In addition to the above mentioned magnetizable materials, suitable materials for the particles 14' include needle-shaped iron oxide or ferromagnetic chromium dioxide.

The acicular particles 14' are located in the previously described matrices 15 which, in turn, are dispersed in the main matrix 31. As in the embodiment of FIG. 1, the main matrix 31 may be located on a substrate 13 (as shown in FIG. 1) or may be self-supporting (as shown in FIG. 3).

The acicular particles 14' may be one of the above mentioned magnetizable materials or of gamma ferric oxide or ferromagnetic chromium dioxide, for example. Since shape anisotropy is generally less temperature dependent than crystal anisotropy, use of acicular particles 14' is preferred in applications where the particles are exposed to temperature at which the magnetocrystalline anisotropy of the spherical particles 14 would be decreased to insufficient values. Also, shape anisotropic particles 14' in needle or flake-like configuration are presently preferred for applications in which a direct optical readout is desired.

Figure 3:
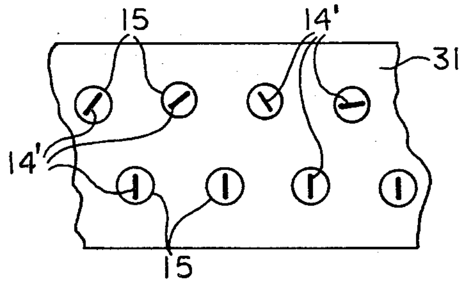
FIG. 3 is a fractional longitudinal section of a modification of the recording medium of FIG. 1 in accordance with a further preferred embodiment of the subject invention.

In that case, the particles 14' can initially be oriented vertically as shown in the lower portion of FIG. 3 and can then be selectively oriented horizontally or permitted to randomize in accordance with input information. While light will penetrate easily past vertically oriented particles, it will be scattered or obscured by horizontally oriented or randomized particles. An optical readout is thus possible.

Because of the enclosure of the particles 14' in submatrices 15 and the maintenance of the submatrices 15 in the solid main matrix 31, it is possible to orient acicular particles without surface deformation of the recording medium 10 and without undue resistance against rotation of the particles about their minor axes.

Further representative information recording processes embodying the subject invention are shown in FIGS. 9*a* to 13. For the purpose of simplicity, only the main matrix 31 with particles 14 are symbolically shown for the recording medium 10 in FIGS. 9*a* to 13. It is, however, to be under-stood and always kept in mind that the matrices 15 are contained in each recording medium 10 herein used.

Figures 9A, 9B:
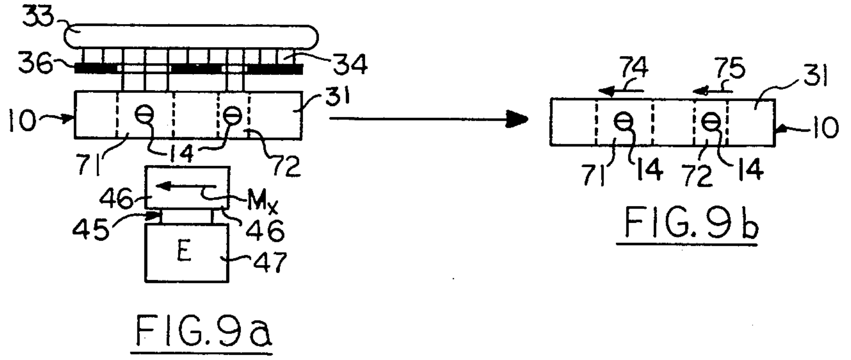
FIGS. 9*a* and 9*b* constitute a flow sheet depicting an information recording method in accordance with a preferred embodiment of the subject invention.

According to the preferred embodiment illustrated in FIGS. 9a and b, information-representative regions 71 and 72 of the medium 10 are fluidized as far as matrices 15 located in those regions are concerned. This is effected by an exposure of the recording medium 10 to thermal radiations 34 that penetrate the information master record 36. While matrices 15 (see FIG. 1) of the portions 71 and 72 are in a fluidized state, the recording medium 10 is exposed to a vectorial magnetic field $M_x$ that orients the uniaxially anisotropic particles 14 in the fluidized matrices 15 in parallel to the *x*-axis.

Exposure of the recording medium 10 is then terminated whereupon the particle orientation in the regions 71 and 72 becomes "frozen" in the recording medium. If desired, this freezing may be accelerated by removing heat from the recording medium by means of a coolant or heatsink. In general, it will, however, be found that the natural loss of heat energy by the matrices to their environment is sufficient for achieving the desired freezing of effected orientation within an appropriate time. The orienting magnetic field $M_x$ is preferably only removed after the particle orientation has become frozen, lest the particles assume disorienting low-energy states under the influence of their own magnetizations.

In principle, the vectorial field $M_x$ may serve as both an orienting force and a magnetizing agency. In this case, the oriented particles 14 present considerable net magnetic moments 74 and 75 in the regions 71 and 72.

The net magnetic moments 74 and 75 may, for instance, be read-out or printed-out. Suitable readout techniques include the conversion of the magnetic moments 74 and 75 into corresponding electric signals by means of a magnetic playback head. The electric signals may then be processed or displayed in any desired manner by such means as conventional computer and display equipment.

If the production of one or more copies of the recorded information is desired, the magnetic moments 74 and 75 are preferably printed out with the aid of a magnetic toner.

Magnetic toners are well known in the art of magnetic printing and may include particles of iron, nickel, cobalt or ferromagnetic compositions. These ferromagnetic particles may be used as a magnetic toner for printout on a tacky surface. If printing out on a dry surface is desired, the ferromagnetic particles are preferably suspended in a toning liquid or provided with shells of fusible material. Suitable magnetic toners and toning and printout methods and equipment are, for instance, disclosed in U.S. Pat. No. 2,932,278, by J.C. Sims, issued Apr. 12, 1960, U.S. Pat. No. 2,943,908, by J.P. Hanna, issued July 5, 1960, U.S. Pat. No. 3,052,564, by F.W. Kulesza, issued Sept. 4, 1962, and U.S. Pat. No. 3,250,636, by R.A. Wilferth, issued May 10, 1966. The specifications and drawings of these patents are herewith incorporated by reference herein.

Another advantageous solution for permitting multiple readout or printout resides in a transfer of the magnetic record from the medium 10 to a further magnetic recording medium (not shown). This transfer or copying of the magnetic record may be effected by placing the further recording medium into contact with the medium 10 and subjecting the further recording medium to anhysteretically alternating magnetic field of the type disclosed in U.S. Pat. No. 2,738,383, by R. Herr et al, issued Mar. 13, 1956, the specification and drawings of which are herewith incorporated by reference herein.

Alternatively, the magnetic record on the medium 10 may be copied on a low-Curie point magnetic recording medium by one of the Curie point copying methods or thermoremanent magnetization techniques disclosed, for instance, in U.S. Pat. No. 3,364,496, by J. Greiner et al, issued Jan. 16, 1968, and U.S. Pat. No. 3,496,304, I by A.M. Nelson, issued Feb. 17, 1970. The specification and drawings of the Greiner et al. and Nelson patents are herewith incorporated by reference herein and it will be noted that the Nelson patent, in addition to a Curie point transfer method, also discloses an anhysteretic copy of the type referred to above. If a Curie point copying method is employed, the low-Curie point medium is preferably heated to above its Curie point prior to being placed in proximity to the medium 10, and is rapidly cooled while in such proximity, so that adverse thermal effects on the matrix 15 are avoided. By way of example, and not by way of limitation, a suitable copy material that has a reasonably low Curie point is ferromagnetic chromium dioxide ($CrO_2$). Other suitable materials include manganese arsenide (MnAs).

Figures 10A, 10B:
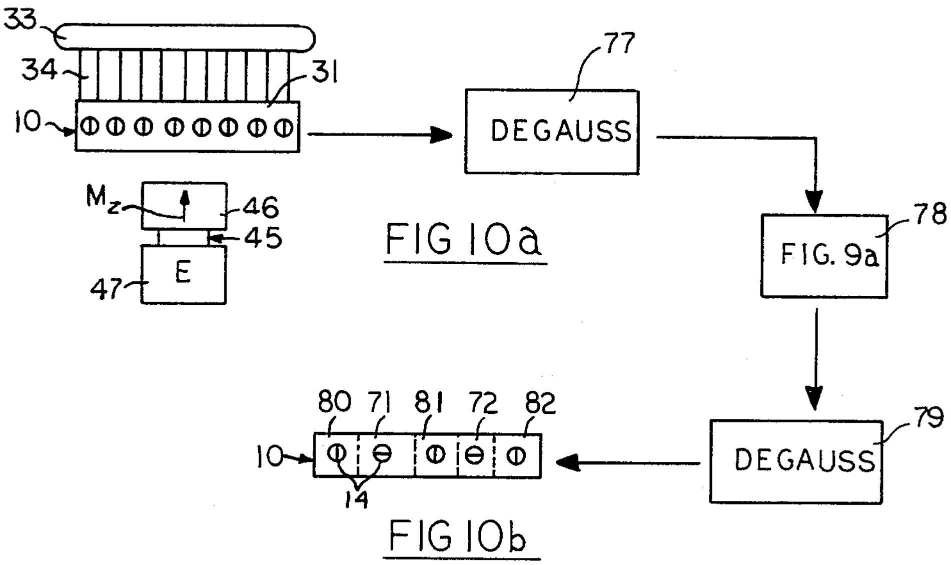
FIGS. 10*a* and 10*b* constitute a flow sheet depicting a modification of the method shown in FIGS. 9*a* and 9*b*, in accordance with a further preferred embodiment of the invention.

Another preferred embodiment of the invention is shown in FIGS. 10*a* and 10*b*. In this connection, it should be noted that the toner image resulting from a printout of the magnetic moments 74 and 75 may be considered a negative if the transparent portions 38 of the master record 36 represent portions that are white or light in the original and if the toner particles used in the printout have a dark appearance. In some instances, the production of negatives is desired, such as in cases where the original is present in the form of a negative of which a positive copy is to be provided.

In other situations, the provision of positive prints or records is preferred.

The method presently to be discussed has the potential of providing either negative or positive records and prints, in accordance with the demands of any given situation.

According to FIG. 10a, the uniaxially anisotropic particles 14 in the matrices 15 are initially oriented in parallel to the *z*-axis. This orientation step is effected prior to the information exposure. By way of example, the initial orientation step of FIG. 10*a* is effected during the manufacture of the recording medium 10. Alternatively, this orientation step may be effected upon a re-use of a previously recorded medium.

To effect the initial orientation step of FIG. 10, the matrices 15 are fluidized by an exposure to the thermal radiation 34. While the matrices 15 are thus in a fluidized state, a vectorial magnetic field $M_z$ is applied by the equipment 45 to the recording medium 10 so that the particles 14 are rotated and oriented in parallel to the *z*-axis. The matrices 15 are then cooled or permitted to cool so that the z-orientation of the particles 14 is frozen in the matrices 15 and 31. The oriented recording medium 10 is thereupon subjected to a degaussing operation by the block 55. Degaussing may be effected with the aid of the equipment 45 with the switch 64 closed and the magnetizer 46 moved relative to the medium 10.

The *z*-oriented particles 14 having been demagnetized, the recording medium 10 is now ready for an informationwise exposure of the type illustrated in FIG. 9*a*, as indicated in FIG. 10*a* by the block 78. This information-wise exposure 78 is preferably followed by a further degaussing operation 79 of the previously described type.

The resulting information record is illustrated in FIG. 10*b*. Reverting at this juncture to the above description of the method according to FIG. 9*a*, it is easy to understand that the particles in the matrix regions 71 and 72 will be oriented in parallel to the *x*-axis after the informationwise exposure according to block 78 has been effected. By sharp contrast, the particles in the unexposed complementary matrix regions 80, 81 and 82 remain in their initial z-orientation. For proper degaussing, the degaussing step symbolized by the block 77 is preferably effected with the magnetizer coil 48 oriented in the *z*-direction, while the degaussing step symbolized by the block 79 should be effected with the magnetizer coil 48 oriented in the *x*-direction. If a further elimination of background magnetization is desired, each degaussing step may be effected in all three directions, *x*, *y* and *z*.

The information record shown in FIG. 10*b* is, among other things, intended to illustrate the important point that the information records according to the subject invention are not necessarily magnetic information records in every case. According to FIG. 10*b*, the recorded information is contained in an orientation of uniaxially anisotropic particles which, at that stage, may or may not be magnetized. The same applies to FIG. 9*b*. The important point to realize is that the orientation-manifested information record already has utility in a unmagnetized or demagnetized state. For instance, the degaussed information record according to FIG. 10*b* may be stored, distributed or sold for subsequent magnetization and printout or readout.

Negative printouts may be obtained by subjecting the information record of FIG. 10*b* to a vectorial magnetic field $M_x$ of the type shown in FIG. 9*a*. In that case, the particles located in the regions 71 and 72 are magnetized, while the particles located in the complementary matrix regions 80, 81 and 82 remain substantially demagnetized.

Alternatively, a vectorial magnetic field $M_z$ of the type shown in FIG. 10*a* may be applied to the recording medium 10 of FIG. 10*b*, so that the particles located in the matrix regions 80, 81 and 82 are magnetized, while the particles located in the matrix regions 71 and 72 remain substantially demagnetized. In this case, net magnetic moments appear at the regions 80, 81 and 82 and a printout with dark magnetic toner results in the production of positive print.

It should, of course, be appreciated at this point that the expressions "positive" and "negative" are used as relative terms and are, at any rate, not intended to limit the invention to the recording of luminous images. Rather, the preferred embodiment illustrated in FIGS. 10*a* and *b* broadly solves the age-old need for magnetic recording methods and media that are characterized by a convenient convertibility of the magnetic record to its magnetic complement.

Figures 11A, 11B, 11C:
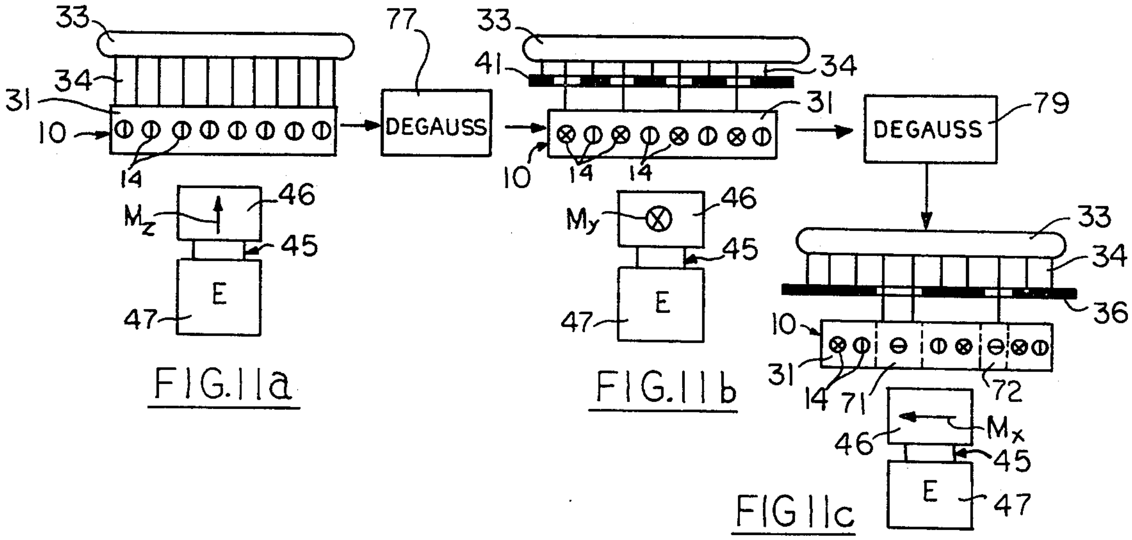
FIGS. 11*a*, 11*b* and 11*c* constitute a flow sheet depicting another modification of the method shown in FIGS. 9*a* and 9*b;*

A further preferred embodiment of the invention is shown in FIGS. 11*a* to *c*.

As illustrated in FIG. 11*a*, the recording medium 10 is exposed to the thermal radiations 34 so that the matrices 15 are transformed to their second or fluidized state. The ferromagnetic particles 14 are then oriented in parallel to the *z*-axis by a vectorial magnetic field $M_z$ provided by the magnetizing equipment 45. The thermal radiation source 33 is thereupon deactivated so that the matrices 15 revert to their first state in which the oriented particles 14 are stationary. The oriented particles 14 are thereupon degaussed as indicated by the block 77 adjacent FIG. 11a.

As shown in FIG. 11*b* a half-tone screen 41 is thereupon interposed between the thermal radiation source 33 and the recording medium 10. As shown in FIG. 8, the half-tone screen 41 is composed of alternating infrared-opaque portions 42 and infrared-transparent portions 43. Thermal radiations which penetrate the screen 41 fluidize matrices 15 in alternative regions of the medium 10, so that particles in those regions can be rotated by the vectorial magnetic field $M_y$ provided by the magnetizing equipment 45 in parallel to the y-axis. The thermal radiation source 33 is then again deactivated so that the fluidized matrices 15 will revert to their first state in which the particle orientations are "frozen."

The result of these operations is a recording medium in which a plurality of first groups of uniaxially anisotropic particles 14 is oriented parallel to the z-axis, while a plurality of second groups of uniaxially anisotropic particles 14 is oriented parallel to the y-axis. As indi-cated by the block 79 adjacent the FIG. 11b, a degaussing step for the y-oriented particles is recommended prior to information-wise exposure so as to preclude an influence of residual magnetic fields on the information-wise particle orientation process.

According to FIG. 11c, information is recorded by orienting third groups of uniaxailly anisotropic particles in parallel to the x-axis. This may be accomplished by subjecting the recording medium 10 to the kind of information exposure step shown in FIG. 9a and also in FIG. 11c.

As other recording media of the subject invention, the medium 10 of FIG. 11c again has the inherent features of complementary magnetic convertibility. Accordingly, the y and z-oriented particles may be degaussed and the x-oriented particles may be magnetized to provide a magnetic record that, upon printout with a dark toner, leads to negative prints of the information contained in the master record 36.

Alternatively, the x-oriented particles in the regions 71 and 72 may be degaussed and the y and 2-oriented particles may be magnetized in their respective directions of axial alignment. In this manner, a magnetic record is provided that is characterized by a plurality of sharp magnetic gradients in portions of the medium 10 that are complementary to the regions 71 and 72. These sharp gradients lend themselves to an improved magnetic readout and provide in the case of a magnetic printout superior large-area fill-in and gray-scale features.

Figures 12A, 12B:
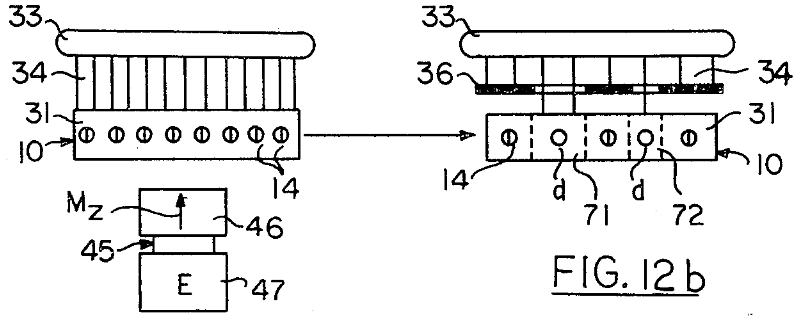

A further preferred embodiment of the invention is shown in FIGS. 12a and b.

As shown in FIG. 12a, the particles 14 in the matrices 15 and 31 are initially oriented in parallel to the z-axis in the general manner indicated in the first illustration of FIG. 10a. At this stage, the oriented particles 14 are magnetized along their easy axes of magnetization by the vectorial magnetic field $M_z$ provided by the magnetizing equipment 45. If desired, an anhysteretic magnetization of the above mentioned type may be employed. In contrast to the practice of the previously described embodiments, the oriented particles 14 are, however, not in a demagnetized state when the information exposure takes place.

The information exposure is illustrated in FIG. 12b where thermal radiations 34 which penetrate the master information record 36 fluidize matrices 15 in the information-representative regions 71 and 72. Since the ferromagnetic particles 14 in the matrices 15 and 31 are in a magnetized state, a magnetic interaction between these particles is possible. In the regions 71 and 72 in which the matrices 15 have been fluidized, this interaction leads to a randomization of sorts of the particles contained in those regions.

As indicated in FIG. 4 at d, the result is a disorientation of the particles 14 in the regions 71 and 72. This disorientation occurs relative to the axes x, y and z, and results from a natural endeavor of rotatable magnetized uniaxially anisotropic particles to seek a low-energy state in which the net magnetic moment of the particular particle groups is ideally at a minimum or, at least, much lower than the net magnetic moment of the particle groups located in the matrix portions that are complementary to the regions 71 and 72.

In this manner, a magnetic record is produced in which recorded information is represented by complementary magnetic and substantially non-magnetic regions. This record may be read-out or printed-out. Printout with a dark magnetic toner will lead to positive prints of the input information or image, since substantially no toner is attracted by disoriented particle groups in the regions 71 and 72.

The embodiment of FIGS. 12a and b are particularly advantageous from a practical point of view, since the process of FIG. 12may be effected by the manufacture of the recording medium 10 so that no magnetizing equipment whatever is needed by the user who effects the information-representative exposure according to FIG. 12b. The energy which is provided by electrostatic equipment in contemporary xerographic copiers is in accordance with the preferred embodiment of FIG. 12b provided in magnetically built-in form by the manufacturer, whereby the equipment needed by the user is very considerably simplified.

Figure 13:
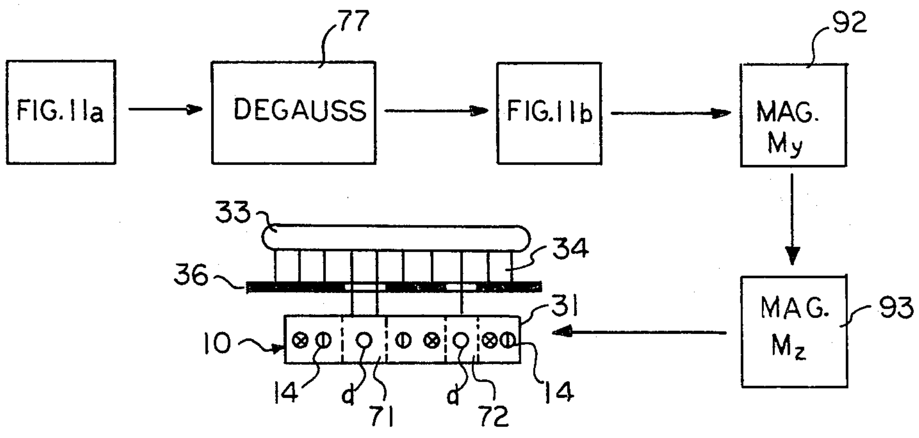
FIG. 13 is a flow sheet of a modification of the preferred embodiment of FIGS. 12*a* and 12*b*, in accordance with a further preferred embodiment of the subject invention.

The further preferred embodiment of FIG. 13 starts out with the initial orientation step of FIG. 11a in which the particles 14 in the matrices 15 and 31 are oriented parallel to the z-axis. The oriented particles 14 are then preferably degaussed as indicated by the block 77. The recording medium 10 is thereupon subjected to the processing step of FIG. 11b, the result of which is a recording medium in which first groups of z-oriented particles alternate with second groups of y-oriented particles. If the y-oriented particles are not already magnetized during the orientation step of FIG. 11b they may, as indicated by the block 92, be magnetized along their easy axes of magnetization. Similarly, the z-oriented particles are magnetized along their easy axes of magnetization, as diagrammatically indicated by the block 93 in FIG. 13.

The resulting magnetic recording medium is exposed as shown at the end of the flow-sheet of FIG. 13 to thermal radiations that penetrate the master information record 36. The ensuing fluidization of matrices 15 in the regions 71 and 72 again permits magnetized particles contained therein to seek a low-energy state of the type shown at d in FIG. 4 and discussed above in connection with FIG. 12b. In this manner, a magnetic information record is obtained in which substantially demagnetized regions 71 and 72 contrast with complementary magnetized record portions which, by virtue of the different orientations of the y and z-oriented particles, are characterized by a plurality of magnetic gradients which improve magnetic readout and provide large-area fill-in and gray-scale rendition during magnetic toner printout.

All the steps down to and including the magnetizing step indicated by the block 93 may be effected by the manufacturer of the recording medium, so that the user does not need any expensive magnetizing equipment for carrying out the simple information exposure step shown at the end of the flow-sheet of FIG. 13.

As an alternative to the provision of large-area fill-in and/or gray scale rendition by particle orientation as shown, for instance, in FIG. 11*b*, it is possible to provide an alternatingly-poled magnetic line pattern with an alternating-current energized magnetic recording device. As shown in dotted lines in FIG. 5 at 99, the direct-current source 50 may be replaced by an alternating-current source 99 (square-wave or sine-wave generator). When energized by the source 99, the magnetizer 46 is moved relative to the recording medium 10, so that an alternatingly-poled magnetic line pattern is recorded.

In terms of FIG. 10*b*, for instance, the magnetizer 46 energized by the source 99 may be moved relative to the medium 10 while oriented in the *z*-direction. In this manner, particles in the matrix portions 80, 81 and 82 will be magnetized with spatially alternating magnetic polarities.

Substantially the same effect is obtained in the embodiment of FIG. 12*b* when the magnetizer 46 is energized, oriented and moved as just described with reference to FIG. 10*b*.

It will now be recognized that the subject invention provides a multitude of highly advanced information recording methods, apparatus and media, and information records, which are characterized by a high degree of utility and versatility.

I claim:

1. An information recording medium comprising in combination:

magnetizable anisotropic particles;

a plurality of spaced first matrices having said particles located therein and having a first state in which said particles are maintained stationary and being transformable into a second state in which said particles are mobile; and means including a solid second matrix containing said first matrices for maintaining said first matrices in position while said first matrices are in said first state and while said first matrices are in said second state.

2. An information recording medium as claimed in claim 1, wherein:

substantially each of said first matrices contains more than one of said particles.

3. An information recording medium as claimed in claim 1, wherein:

said particles are anisotropic single-domain particles.

4. An information recording medium as claimed in claim 1, wherein:

said particles are spherical, uniaxially anisotropic particles.

5. An information recording medium as claimed in claim 1, wherein:

said particles are of a material selected from the group consisting of hexagonal cobalt, manganese bismuthide (MnBi), and $Co_5$ R, wherein R is a rare-earth metal.

6. An information recording medium as claimed in claim 1, wherein:

said anisotropic particles are in an oriented state.

7. An information recording medium as claimed in claim 1, wherein:

said anisotropic particles are in a magnetized and oriented state.

8. An information recording medium as claimed in claim 1, wherein:

said first matrices comprise material being fluidizable upon thermal exposure.

9. An information recording medium as claimed in claim 1, wherein:

said first matrices are photosensitive as to their transformability into said second state.

10. An information recording medium as claimed in claim 1, comprising an information record in the form of an information-wise orientation of said particles.

11. An information recording medium as claimed in claim 1, wherein:

said first matrices comprise material being fluidizable upon thermal exposure;

said first matrix is of a material remaining solid upon said thermal exposure; and said recording medium includes means for ex-posing said first matrices to a thermal image of said information in response to a luminous image of said information.

12. In an information recording method, the improvement comprising in combination the steps of:

providing magnetizable anisotropic particles;

enclosing said particles in a plurality of first matrices having a first state in which said particles are maintained substantially stationary and being transformable into a second state in which said particles are mobile;

providing said first matrices with said enclosed particles in a solid second matrix for maintaining said first matrices in position while said first matrices are in said first state and while said first matrices are in said second state;

transforming predetermined ones of said first matrices selected in accordance with said information to said second state; and magnetically orienting said anisotropic particles in said predetermined first matrices to provide an information record.

13. An information recording method as claimed in claim 12, wherein:

said particles are provided in the form of ani-sotropic single-domain particles.

14. An information recording method as claimed in claim 12, wherein:

said particles are provided in the form of spherical, uniaxially anisotropic particles.

15. An information recording method as claimed in claim 12, wherein:

said particles are made of a material selected from the group consisting of hexagonal coblat, manganese bismuthide (MnBi), and $Co_5$ R, wherein R is a rare-earth metal.

16. An information recording method as claimed in claim 12, wherein:

substantially each of said first matrices is provided with more than one of said particles.

17. An information recording method as claimed in claim 12, wherein:

said first matrices are made of material being fluidizable upon thermal exposure;

said second matrix is made of a material re-maining solid upon said thermal exposure; and said predetermined first matrices are fluidized by exposure to a thermal image corresponding to said information.

18. An information recording method as claimed in claim 17, wherein:

said predetermined first matrices are fluidized by means of a photoconductor device providing said thermal image in response to a luminous image of the information to be recorded.

19. In an information recording method, the improvement comprising in combination the steps of:

providing magnetizable anisotropic particles;

enclosing said particles in a plurality of first matrices having a first state in which said particles are maintained substantially stationary and being transformable into a second state in which said particles are mobile;

providing said first matrices with said enclosed particles in a solid second matrix for maintaining said first matrices in position while said first matrices are in said first state and while said first matrices are in said second state;

transforming said first matrices to said second state and orienting and magnetizing said anisotropic particles in said first matrices;

transforming said first matrices to said first state; and transforming predetermined ones of said first matrices selected in accordance with said information to said second state whereby the anisotropic particles in said predetermined first matrices will become disoriented to display minimum net magnetic moments.

20. An information recording method as claimed in claim 19, wherein:

said particles are provided in the form of ani-sotropic single-domain particles.

21. An information recording method as claimed in claim 19, wherein:

said particles are provided in the form of spherical, uniaxially anisotropic ferromagnetic particles.

22. An information recording method as claimed in claim 19, wherein:

said particles are made of a material selected from the group consisting of hexagonal cobalt, manganese bismuthide (MnBi), and $Co_5$ R, wherein R is a rare-earth metal.

23. An information recording method as claimed in claim 19, wherein:

substantially each of said first matrices is provided with more than one of said particles.

24. An information recording method as claimed in claim 19, wherein:

said first matrices are made of material being fluidizable upon thermal exposure;

said second matrix is made of a material remain-ing solid upon said thermal exposure; and said predetermined first matrices are fluidized by exposure to a thermal image corresponding to said information.

25. An information recording method as claimed in claim 24, wherein:

said predetermined first matrices are fluidized by means of a photoconductor device providing said thermal image in response to a luminous image of the information to be recorded.

* * * * *

PO-1050
(5/69)

UNITED STATES PATENT OFFICE
CERTIFICATE OF CORRECTION

Patent No. 3,757,353 Dated September 4, 1973

Inventor(s) Frederick J. Jeffers

It is certified that error appears in the above-identified patent and that said Letters Patent are hereby corrected as shown below:

Title, "ARTICLE" should be --PARTICLE--; Column 1, line 25, "or" should be --of--. Column 1, line 56, "of" should be --or--. Column 5, line 2, "substan-tially" should be --substantially--. Column 7, line 5, "of" should be --if--. Column 7, line20, "anistropic" should be --anisotropic--. Column 7, line 21, "anisotropic" should be --be--. Column 8, line 21, "Helmolz" should be --Helmholz--. Column 9, line 54, "under-stood" should be --understood--. Column 13, line 14, "indi-cated" should be --indicated--. Column 13, line 34, "2-oriented" should be --z-oriented--. Column 14, line 21, "12" should be --12a--. Column 16, line 16, "first" should be --second--. Column 16, line 18, "ex-posing" should be --exposing--. Column 16, line 43, "ani-sotropic" should be --anisotropic--. Column 16, line 52, "coblat" should be --cobalt--. Column 16, line 64, "re-maining" should be --remaining--. Column 17, line 32, "ani-sotropic" should be --anisotropic--. Column 18, line 21, "remain-ing" should be -- remaining--.

Signed and sealed this 25th day of December 1973.

(SEAL)
Attest:

EDWARD M.FLETCHER,JR.
Attesting Officer

RENE D. TEGTMEYER
Acting Commissioner of Patents